(12) United States Patent
Fletcher et al.

(10) Patent No.: US 9,169,777 B2
(45) Date of Patent: Oct. 27, 2015

(54) GAS TURBINE ENGINE WITH WATER AND STEAM INJECTION

(75) Inventors: Paul Fletcher, Rugby (GB); Andrew C. Graham, Coventry (GB)

(73) Assignee: ROLLS-ROYCE plc, London (GB)

( * ) Notice: Subject to any disclaimer, the term of this patent is extended or adjusted under 35 U.S.C. 154(b) by 979 days.

(21) Appl. No.: 13/333,000

(22) Filed: Dec. 21, 2011

(65) Prior Publication Data

US 2012/0180496 A1     Jul. 19, 2012

(30) Foreign Application Priority Data

Jan. 14, 2011    (GB) .................................. 1100602.0

(51) Int. Cl.
| | |
|---|---|
| F02C 6/18 | (2006.01) |
| F02C 3/30 | (2006.01) |
| F02C 7/12 | (2006.01) |
| F01K 17/04 | (2006.01) |
| F01K 23/10 | (2006.01) |
| F01K 21/04 | (2006.01) |

(52) U.S. Cl.
CPC . *F02C 6/18* (2013.01); *F01K 17/04* (2013.01); *F01K 21/047* (2013.01); *F01K 23/10* (2013.01); *F02C 3/30* (2013.01); *F02C 7/12* (2013.01)

(58) Field of Classification Search
CPC ................ F02C 3/30; F02C 6/18; F02C 7/12; F01K 23/10; F01K 21/047; F01K 17/04
USPC ............................. 60/746, 775, 39.55, 39.182
See application file for complete search history.

(56) References Cited

U.S. PATENT DOCUMENTS

| | | | |
|---|---|---|---|
| 4,160,362 A | | 7/1979 | Martens et al. |
| 4,928,478 A | * | 5/1990 | Maslak ........................... 60/775 |
| 5,054,279 A | | 10/1991 | Hines |
| 5,473,898 A | * | 12/1995 | Briesch .......................... 60/646 |
| 5,682,737 A | | 11/1997 | Schmidli |
| 6,983,605 B1 | * | 1/2006 | Hook et al. ..................... 60/775 |
| 2007/0051112 A1 | * | 3/2007 | Althaus ........................... 60/786 |

(Continued)

FOREIGN PATENT DOCUMENTS

| | | |
|---|---|---|
| EP | 0 209 820 A1 | 1/1987 |
| EP | 1 143 199 A1 | 10/2001 |
| EP | 1 905 964 A2 | 4/2008 |

(Continued)

OTHER PUBLICATIONS

European Search Report issued in European Application No. EP 11 19 4938 on May 8, 2012.
Apr. 20, 2011 Search Report issued in British Patent Application No. 1100602.0.

*Primary Examiner* — Phutthiwat Wongwian
*Assistant Examiner* — Carlos A Rivera
(74) *Attorney, Agent, or Firm* — Oliff PLC

(57) ABSTRACT

A gas turbine engine has in flow series: a compressor section, a combustor, and a turbine section. The engine further has a steam generator, and a water and steam delivery system. During an engine start-up period, the delivery system delivers liquid water to the combustor and mixes the delivered water in its liquid state with working gas in the combustor. After the start-up period, the delivery system accepts steam from the steam generator, delivers the steam to the combustor and mixes the delivered steam in its gaseous state with the working gas in the combustor.

10 Claims, 2 Drawing Sheets

(56) References Cited

U.S. PATENT DOCUMENTS

2007/0214766 A1* 9/2007 Obana et al. ............. 60/39.15
2010/0229566 A1* 9/2010 Takahashi et al. .......... 60/772
2010/0242488 A1* 9/2010 Veninger et al. ........... 60/772

FOREIGN PATENT DOCUMENTS

| EP | 2 228 515 A2 | 9/2010 |
| WO | WO 2004/106718 A1 | 12/2004 |
| WO | WO 2009/070149 A1 | 6/2009 |

* cited by examiner

GAS TURBINE ENGINE WITH WATER AND STEAM INJECTION

The present invention relates to a gas turbine engine, and particularly, but not exclusively, to a gas turbine engine in which steam is injected and a method of operating such an engine.

FIG. 1 shows schematically an industrial gas turbine engine 1 which comprises, in flow series through the engine, a compressor section 2, a combustor 3, and a turbine section 4. The engine works in a conventional manner so that air entering an intake 5 of the engine forms a flow into the compressor section, which compresses the flow before delivering the compressed air into the combustor where it is mixed with fuel and the mixture combusted. The resultant hot combustion products then expand through and thereby drive the turbine section before being exhausted through an exhaust 6. The turbine section is mounted on a shaft or concentric shafts 7 with the compressor section and a generator 8. Power extracted from the working gas by the turbine section drives the compressor section and the generator.

Steam injection is employed on gas turbine industrial engines to reduce NOx emissions and boost power. The specific fuel consumption of the engine can also be improved as the steam is usually raised using engine exhaust heat, e.g. in a heat recovery steam generator (HRSG). For example, as described in EP A 1905964, steam may be injected into the vicinity of the outlet of the compressor section. It may also be injected into the turbine section where it beneficially cools the turbine and can provide an additional power boost. Steam is a much more effective cooling medium than compressor delivery air, due to its higher specific heat (approximately double that of compressor delivery air), higher conductivity, and lower temperature.

In some gas turbine systems, steam is generated in a once through steam generator (OTSG) and used to power a steam turbine in addition to providing the steam for steam injection. The use of both a gas and steam turbine in this manner is known as a combined cycle. An OTSG does not have the thick walls of the drums of conventional HRSGs, which generally allows start-up times to be short. The short start-up time is achieved, in part, by the ability of the OTSG to run dry i.e. without any water flowing through the tubes on the secondary side of the heat exchanger.

Rapid starting of engines is increasingly desirable, as ever more renewable generation sources are connected to the power grid. However, even at the present relatively low level of renewable power generation, there are large swings in electricity price with, for example, peaks at morning and evening. A long start time to full power requires fuel to be burnt for extended periods before an economic price is available for the electricity generated.

A basic engine, i.e. without steam injection and without combined cycle, is generally able to respond rapidly to load changes, and can provide a rapid start-up. For example, a 10 minute start-up period is an industry standard for engines in the 40-100 MW class (which may be aero-derivative engines). However, such an engine does not provide the operational benefits, such as improved efficiency and reduced emissions, that can be obtained through steam injection and combined cycle.

However, a disadvantage of steam injection and combined cycle is usually an inability to start rapidly to full power. In particular HRSGs, including OTSGs, must limit the rate of pressure increase when starting from cold in order to avoid water flow instabilities which can induce damaging thermal cycles.

The present invention seeks to improve start-up times while preserving operational benefits such as improved efficiency and reduced emissions.

Accordingly, a first aspect of the present invention provides a gas turbine engine having in flow series:
 a compressor section,
 a combustor, and
 a turbine section;
 wherein the engine further has:
 a steam generator, and
 a water and steam delivery system which is adapted (i) during an engine start-up period to deliver liquid water to the combustor and to mix the delivered water in its liquid state with working gas in the combustor, and (ii) after the start-up period to accept steam from the steam generator, to deliver the steam to the combustor and to mix the delivered steam in its gaseous state with the working gas in the combustor.

The steam generator usually requires a period of time from engine start-up before it reaches operational pressure and is able to supply steam to the delivery system. However, by mixing liquid water with the working gas in the combustor, the engine can achieve similar power ratings as when steam is mixing with the working gas in the combustor, albeit at lower efficiency, as additional fuel flow is needed to evaporate the water in the combustor. However, as the water can be made available immediately at engine starting, the time to full power from start-up can be reduced.

The engine may have any one or, to the extent that they are compatible, any combination of the following optional features.

The delivery system can include spray nozzles which, during the start-up period, spray the liquid water into the combustor. In this way, the water can be delivered in the form of fine droplets, which can improve its rate of mixing and evaporation. Conveniently, the engine may have fuel injectors for injecting fuel into the combustor, and the spray nozzles can then be carried by the fuel injectors. At times when the spray nozzles are not delivering water, they may be used to provide a flow of air into the combustor, e.g. to improve cooling or fuel distribution, or to deliver the steam into the combustor. However, the engine may have a dedicated sub-system for delivering steam into the combustor after the start-up period. Such a sub-system may be able to achieve higher steam flow rates than can be delivered through the liquid water spray nozzles.

The combustor typically includes an inner chamber and an outer chamber which surrounds the inner chamber, compressed air delivered by the compressor section flowing from the outer chamber into the inner chamber, and fuel being combusted in the inner chamber. The delivery system can then be adapted to deliver the liquid water to at least the inner chamber and to mix the delivered liquid water with the working gas in the inner chamber. However, the delivery system can also be adapted to deliver the liquid water to the outer chamber, where it mixes with the compressed air. For example, at least about 80% or 90% of the water may be delivered to the inner chamber, and the remainder of the water delivered to the combustor may be delivered to the outer chamber.

The steam generator may be a heat recovery steam generator which recovers heat from the working gas exhausted from the turbine section.

The engine may further have a cooling system which carries a coolant to components of the turbine section, wherein the delivery system is further adapted to provide liquid water or steam for the coolant, the steam being accepted from the steam generator. For example, the delivery system may further have a humidifier which humidifies a flow of air with liquid water, and the delivery system may then be adapted to provide the humidified air flow as a coolant to be carried by the cooling system. Thus, as with the delivery of water to the combustor, the humidified air flow can provide operational benefits, e.g. at times when steam may not be not available such as engine start-up.

Conveniently, the flow of air to be humidified can be compressed air bled from the compressor section. When steam is provided for the coolant, the coolant can contain a mixture of steam and air (e.g. compressed air bled from the compressor section).

The delivery system can provide the liquid water for the coolant during the start-up period, and provide the steam for the coolant after the start-up period.

A second aspect of the present invention provides a method of operating a gas turbine engine having in flow series:
a compressor section,
a combustor, and
a turbine section;
wherein the method includes the steps of:
during an engine start-up period delivering liquid water to the combustor and mixing the delivered water in its liquid state with working gas in the combustor, and
after the start-up period delivering steam to the combustor and mixing the delivered steam in its gaseous state with the working gas in the combustor.

The method may have any one or, to the extent that they are compatible, any combination of the following optional features. Further, optional features of the engine of the first aspect can provide corresponding optional features in the method.

The combustor typically includes an inner chamber and an outer chamber which surrounds the inner chamber, compressed air delivered by the compressor section flowing from the outer chamber into the inner chamber, and fuel being combusted in the inner chamber. The liquid water can then be delivered to at least the inner chamber and mixed with the working gas in the inner chamber. However, the liquid water can also be delivered to the outer chamber and mixed with the compressed air. For example, at least about 80% or 90% of the water may be delivered to the inner chamber, and the remainder of the water delivered to the combustor may be delivered to the outer chamber.

The method may further include a step of generating the steam by recovering heat from the working gas exhausted from the turbine section.

The method may further include a step of carrying a coolant comprising liquid water or steam to components of the turbine section. For example, the coolant comprising liquid water can be an air flow (e.g. compressed air bled from compressor section) humidified with water.

The coolant can comprise liquid water during the engine start-up period, and can comprise steam after the start-up period.

Embodiments of the invention will now be described by way of example with reference to the accompanying drawings in which:

FIG. 2 shows schematically an industrial gas turbine engine 11 having a water and steam delivery system. Components of the engine which correspond to similar components of the engine 1 of FIG. 1 have the same reference numbers in FIG. 2 as they do in FIG. 1.

The engine 11 has a water and steam delivery system which operates under a liquid water delivery mode at and for a period of time after engine start-up and operates under a steam delivery mode thereafter. The steam for the steam delivery mode is generated by a heat exchanger 12, which may be an HRSG or OTSG utilising the heat from the engine exhaust 6. The heat exchanger may be operated as described in EP A 1905964.

Figure 3:
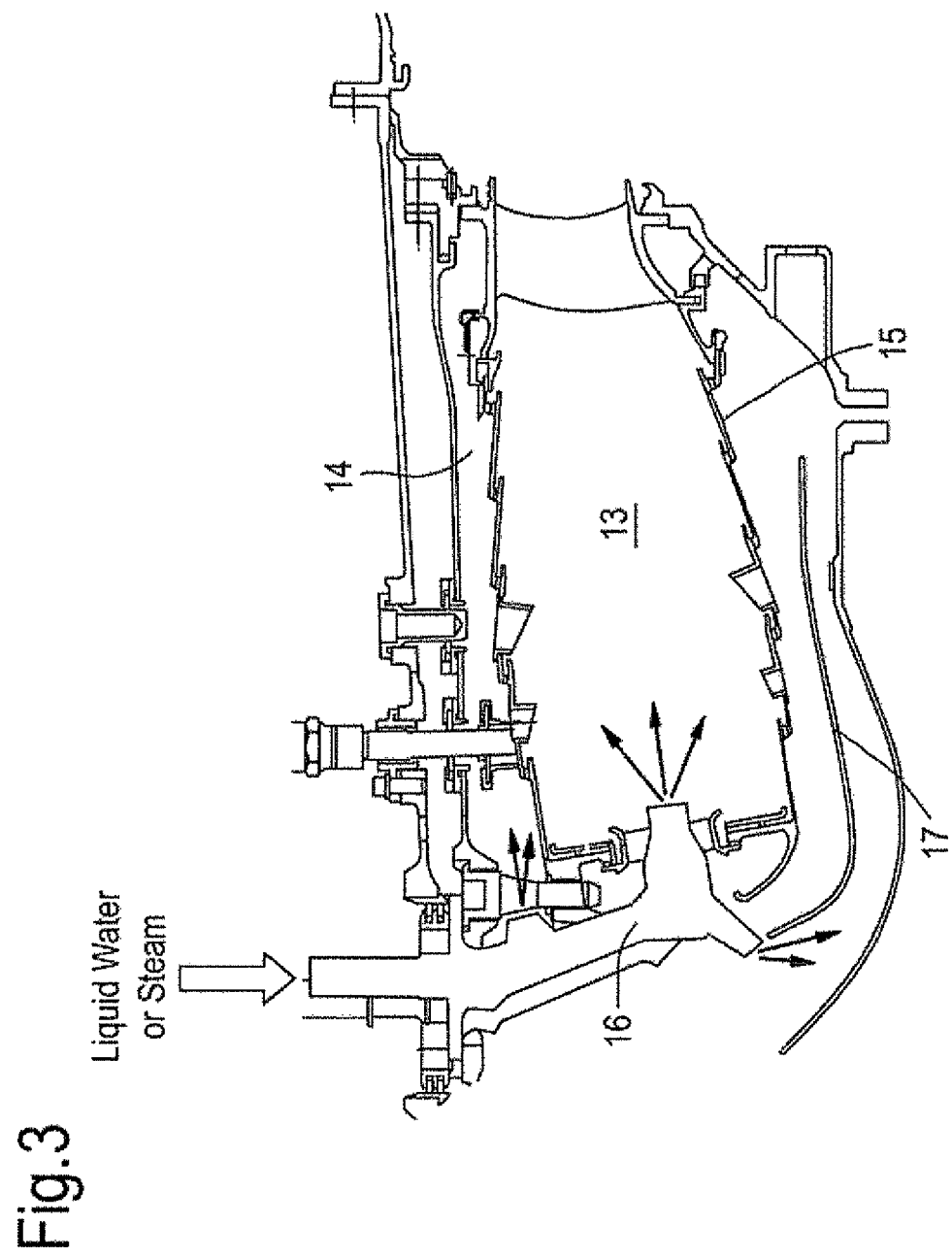
FIG. 3 shows schematically a partial longitudinal section through the combustor of the engine of FIG. 2.

FIG. 3 shows schematically a partial longitudinal section through annular combustor 3 which has an inner chamber 13 and an outer chamber 14 surrounding the inner chamber. Compressed air from the compressor section 2 enters the inner and outer chambers at their front ends. At least some of the compressed air in the side streams formed in the outer chamber then also flows into the inner chamber through apertures in the combustion liner 15 which separate the inner from the outer chamber. This additional flow promotes effective and stable combustion in the inner chamber and helps to cool the combustion liner. Circumferentially spaced fuel injectors 16 inject an atomised spray of fuel into the inner chamber.

In the liquid water delivery mode, liquid water is delivered to the combustor via spray nozzles carried by the fuel injectors 16. As indicated by the arrows exiting the fuel injector in FIG. 3, a portion (typically 80% to 90%) of the delivered water enters the inner chamber 12 where it mixes with the working gas in the inner chamber, and the remainder of the delivered water enters the outer chamber where it mixes with the compressed air of the side streams. One or more baffles 17 located in the outer chamber may guide the moist flow of the side streams to regions selected for preferential cooling, the water in the side streams reducing the air temperature and increasing the water vapour content, thereby increasing the specific heat and conductivity. In engine operating modes when neither liquid water nor steam is flowing, the spray nozzles carried by the fuel injectors may beneficially allow a small flow of air into the combustor to improve cooling and/or fuel distribution.

In the steam delivery mode, by contrast, the liquid water delivery is shut off and steam produced by the heat exchanger 12 can be delivered to the combustor via the spray nozzles carried by the fuel injectors 16. Additionally or alternatively, the steam may be routed into the combustor by a dedicated sub-system (not shown in FIG. 3). This can allow a much greater flow rate of steam to be injected into the combustor than can be achieved via the spray nozzles.

Thus during engine start-up, before the heat exchanger 12 has reached operational pressure, the delivered liquid water mixes with the working gas in the combustor 3. in this way, the engine 11 can achieve the same power rating as when steam is supplied, albeit at lower efficiency as additional fuel flow is required to evaporate the water within the combustor.

Figure 1:
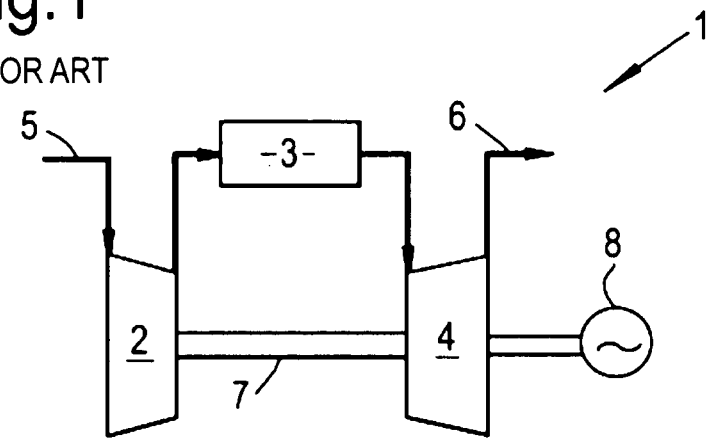
FIG. 1 shows schematically an industrial gas turbine engine.
Figure 2:
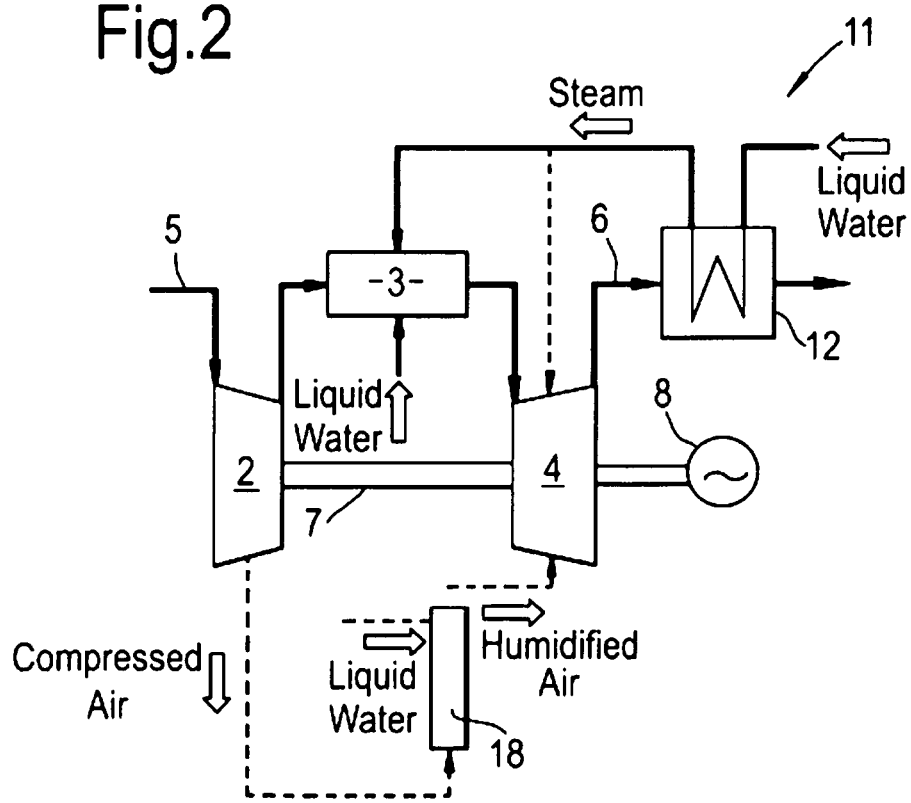
FIG. 2 shows schematically an industrial gas turbine engine having a water and steam delivery system.

The engine 11 also has a cooling system for carrying a coolant to components (e.g. turbine blades, vanes, shrouds) of the turbine section 4. The cooling system comprises an arrangement of flow channels, seals etc. which direct the coolant to where it is needed. The delivery system is able to provide the coolant (as indicated by dashed lines in FIG. 2).

In the steam delivery mode, the coolant is steam generated by the heat exchanger 12, steam having a higher specific heat and conductivity than air at the same temperature and pressure. However, optionally, the coolant can contain a mixture of steam and air (for example compressed air bled from the compressor section), which can then allow a greater amount of steam to be diverted to the combustor 3 e.g. for improved emissions control. In the liquid water delivery mode when steam is not available, the coolant is a humidified flow of air. This flow can be provided by directing a flow of air (which is typically pressurised air bled from the compressor section 2) through a saturator tower 18, which is preferably located off-engine and which humidifies the air flow with water. The humidified air flow typically has a higher density than steam alone, due to a higher molecular weight and a lower temperature. This results in a higher percentage mass flow passing through the cooling system, offsetting the shortfall in specific heat and conductivity versus steam.

During start-up, the relative amounts of liquid water being delivered to the combustor 3 and the cooling system of the turbine section 4 can be varied. For example, a reduced water delivery rate to the combustor can allow the engine to operate at a higher temperature, which may require an increased water delivery rate to the turbine section cooling system.

Advantageously, the engine 11 can achieve a fast start via liquid water injection. In particular, the use of liquid water in the engine allows the normally steam injected combustor 3 to operate at the same power rating as when steam is supplied and the normally steam cooled turbine section 4 to operate at full temperature before steam is available. However, when steam does become available, the engine also provides the improved efficiency and reduced emissions benefits of steam injection.

Providing liquid water to the engine before steam is available is much simpler, less expensive and more compact than alternative means of steam generation during engine start-up. For example, "chemical steam" produced using hydrogen peroxide is undesirable as large quantities of this hazardous chemical would need to be stored and transported in order to supply the engine with steam.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A method of operating a gas turbine engine having in flow series:
    a compressor section,
    a combustor, and
    a turbine section;
    wherein the method includes the steps of:
        during an engine start-up period, delivering liquid water to the combustor and mixing the delivered water in a liquid state with working gas in the combustor, and
        after the start-up period,
            i) shutting off the liquid water supply to the combustor, and
            ii) delivering steam to the combustor and mixing the delivered steam in a gaseous state with the working gas in the combustor,
    wherein the engine start-up period is defined by the time taken for a steam generator to reach an operational pressure at which the steam generator is able to supply steam to the combustor; and
    wherein, after the start-up period, continuously delivering the steam to the combustor.

2. A method according to claim 1, further having spray nozzles which, during the start-up period, spray the liquid water into the combustor.

3. A method according to claim 2, further having fuel injectors for injecting fuel into the combustor, the spray nozzles being carried by the fuel injectors.

4. A method according to claim 2, wherein the spray nozzles, after the start-up period, deliver the steam into the combustor.

5. A method according to claim 1, further having a dedicated sub-system for delivering the steam into the combustor after the start-up period.

6. A method according to claim 1, wherein the combustor includes an inner chamber and an outer chamber which surrounds the inner chamber, compressed air delivered by the compressor section flowing from the outer chamber into the inner chamber, and fuel being combusted in the inner chamber; and wherein the liquid water is delivered to at least the inner chamber and is mixed with the working gas in the inner chamber.

7. A method according to claim 1, further including a step of generating the steam by recovering heat from the working gas exhausted from the turbine section.

8. A method according to claim 1 further including a step of carrying a coolant comprising liquid water or steam to components of the turbine section.

9. A method according to claim 8, wherein the coolant comprising liquid water is an air flow humidified with liquid water.

10. A method according to claim 8, wherein the coolant comprises liquid water during the start-up period and comprises steam after the start-up period.

* * * * *